United States Patent
Lemieux

(10) Patent No.: US 6,631,128 B1
(45) Date of Patent: Oct. 7, 2003

(54) CORE NETWORK OPTIMIZATION OF TOPOLOGY AND TECHNOLOGY FOR TRAFFIC HANDLING

(75) Inventor: Yves Lemieux, Kirkland (CA)

(73) Assignee: Telefonaktiebolaget L M Ericcson (publ), Stockholm (SE)

( * ) Notice: Subject to any disclaimer, the term of this patent is extended or adjusted under 35 U.S.C. 154(b) by 0 days.

(21) Appl. No.: 09/321,150

(22) Filed: May 27, 1999

(51) Int. Cl.⁷ .................................................. H04L 12/28
(52) U.S. Cl. ........................ 370/351; 370/230; 370/255; 370/401; 709/220; 706/46
(58) Field of Search ................... 370/232, 229, 370/230, 252, 351, 389, 465, 466, 469, 400, 401, 403, 335, 356, 392, 402, 449, 395.2, 395.31, 395.32, 395.5, 405, 406, 408; 709/220

(56) References Cited

U.S. PATENT DOCUMENTS

| | | | |
|---|---|---|---|
| 5,175,800 A | 12/1992 | Galis et al. ................... 395/51 |
| 5,434,848 A | 7/1995 | Chimento, Jr. et al. ..... 370/232 |
| 5,452,287 A | 9/1995 | DiCecco et al. ............ 370/110 |
| 5,583,860 A | 12/1996 | Iwakawa et al. ............ 370/232 |
| 5,598,532 A | * 1/1997 | Liron ............................ 703/2 |
| 5,642,360 A | 6/1997 | Trainin ........................ 370/230 |
| 5,659,685 A | * 8/1997 | Williams et al. ............ 709/220 |
| 5,729,536 A | 3/1998 | Doshi et al. ................. 370/398 |
| 5,809,129 A | 9/1998 | Andersson et al. ......... 379/221 |
| 5,809,282 A | * 9/1998 | Cooper et al. .............. 709/220 |
| 5,974,457 A | 10/1999 | Waclawsky et al. ........ 709/224 |
| 6,012,152 A | * 1/2000 | Douik et al. ................. 714/26 |
| 6,246,669 B1 | * 6/2001 | Chevalier et al. ........... 370/238 |
| 6,314,093 B1 | * 11/2001 | Mann et al. ................. 370/351 |
| 6,374,303 B1 | * 4/2002 | Armitage et al. ........... 709/242 |
| 6,377,987 B1 | * 4/2002 | Kracht ........................ 709/220 |
| 6,477,166 B1 | * 11/2002 | Sanzi et al. ............... 370/395.1 |

FOREIGN PATENT DOCUMENTS

| | | |
|---|---|---|
| EP | 1005195 | 5/2000 |
| JP | 97214514 | 8/1997 |
| WO | WO 00/19680 | 4/2000 |

OTHER PUBLICATIONS

Michael Mouly, Marie–Bernadette Pautet: "The GSM System for Mobile Communications", 1992, ISBN 2–9507190–7, see pages 100–104, figure 2.15.

International Search Report, PCT/SE00/00814, dated Nov. 24, 2000.

* cited by examiner

*Primary Examiner*—Dang Ton
*Assistant Examiner*—Tri H. Phan
(74) *Attorney, Agent, or Firm*—Jenkens & Gilchrist; Sandra Beauchesne

(57) ABSTRACT

Routing nodes that are interconnected within a communications network are not configured to utilize a single type of switching technology in the context of a single type of networking topology. Responsive to data input and the operation of an expert system, the routing nodes are configured to implement a certain switching technology type and networking technology type, and thus optimize portions of the communications network to handle different types of traffic. Traffic of the various different types may then be efficiently handled through the network by its correspondingly optimized portion.

17 Claims, 4 Drawing Sheets

CORE NETWORK OPTIMIZATION OF TOPOLOGY AND TECHNOLOGY FOR TRAFFIC HANDLING

BACKGROUND OF THE INVENTION

1. Technical Field of the Invention

The present invention relates to the management of communications networks and, in particular, to the optimization of topology and technology types within a network to support certain traffic types.

2. Description of Related Art

Historically, communications networks have been designed as tightly coupled systems wherein one traffic type, one technology type, and one topology type are linked together to define and provide communications service through the network. For example, a communications network being designed to primarily handle voice traffic may utilize a completely different selection of technology and topology type than a network being designed to primarily handle data (computer) traffic. It is not unusual, however, for one of these tightly coupled designed networks to handle a wide variety of traffic types, or alternatively for the type of traffic being handled by that network to vary over time. That being the case, instances may arise where the communications network is not configured from a technology and topology perspective to provide optimal service in view of the currently being handled traffic. There is need for greater flexibility in communications network configuration and operation to serve a variety of traffic needs in an optimal fashion.

SUMMARY OF THE INVENTION

Generic routing nodes are interconnected to form a core communications network. By "generic" it is meant that the routing nodes are not configured to utilize a single type of switching technology in the context of a single type of networking topology. Instead, the generic routing nodes are dynamically configured by an optimizer functionality to implement a certain switching technology type and networking topology type, and thus optimize portions of the communications network to handle different types of traffic. Traffic of the various different types may then be routed for handling by its correspondingly optimized portion of the network.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
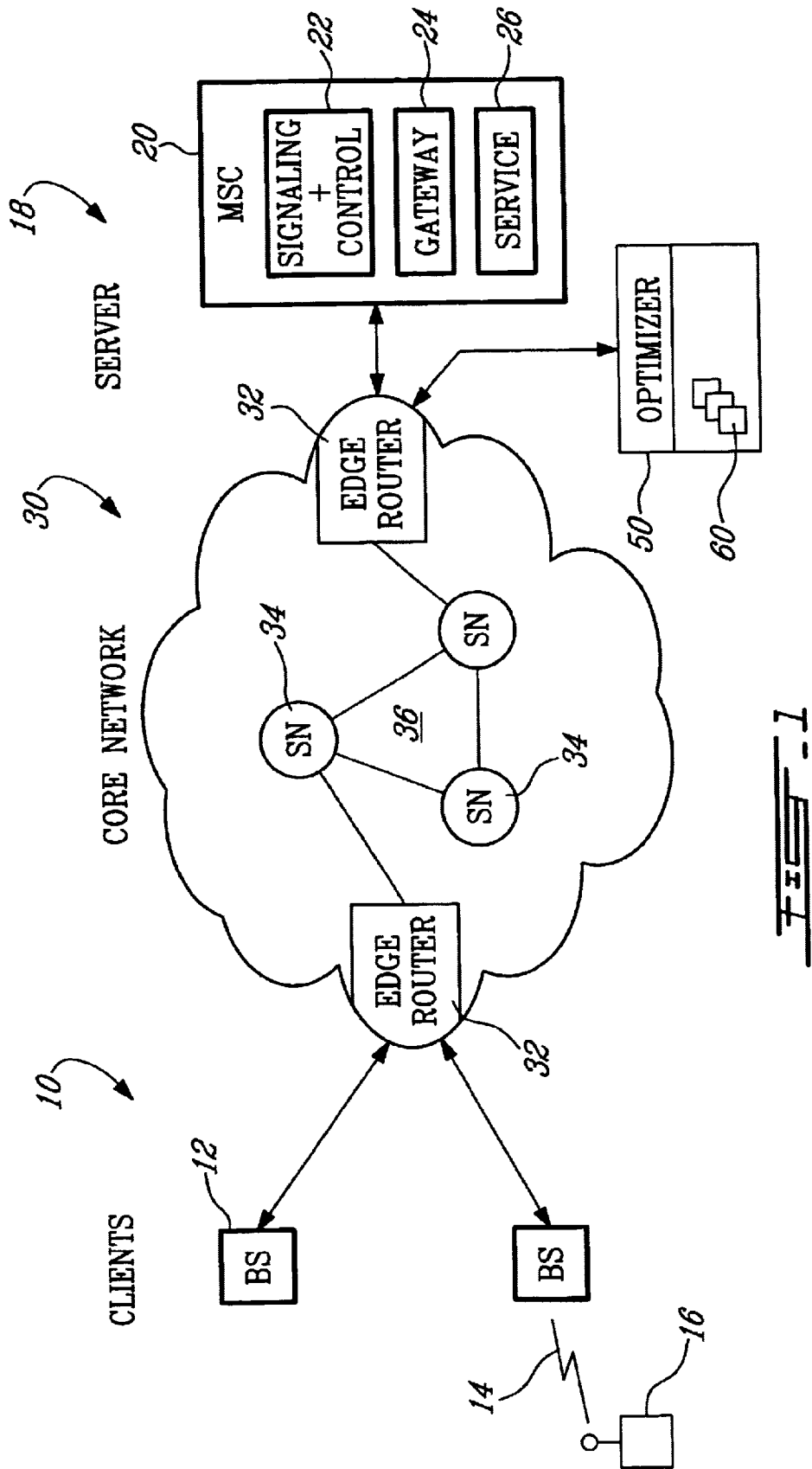
FIG. 1 is a block diagram of a client/server environment wireless communications network in accordance with the present invention.

Reference is now made to FIG. 1 wherein there is shown a block diagram of a client/server environment wireless communications network in accordance with the present invention. In providing wireless communications services, the clients 10 comprise a plurality of base stations 12 that support subscriber communications over an air interface 14 with a plurality of mobile stations 16. The server 18 comprises a mobile switching center 20 having functionalities for network signaling and control 22, gateway operations 24 for interfacing the network to the Internet or an intranet, and service provision 26 for supporting subscriber access to services such as, for example, voice mail, intelligent networking (IN), and the like. Interconnecting the clients 10 to the server 18 is a core network 30 comprised of a plurality of edge routers 32 supporting connections to the base stations 12 and the mobile switching center 20, and a plurality of cell switch routers 34 that are interconnected 36 in at least an almost fully-meshed network configuration that supports the use of a number of different types of networking topologies (such as, for example, linear, star, mesh, ring, tree, and the like). Some of the cell switch routers 34 support connections to the edge routers 32.

The edge routers 32 and cell switch routers 34 of the core network 30 comprise generic nodes. By "generic" it is meant that the edge routers 32 and cell switch routers 34 are not configured to utilize a single type of switching technology (such as, for example, frame relay, asynchronous transfer mode (ATM), ethernet, or the like) in the context of a single type of networking topology. Put another way, "generic" refers to an ability of the edge routers 32 and cell switch routers 34 to utilize, on an as needed and specified basis, any one of a number of available switching technologies (such as, for example, those mentioned above) when supporting the routing of subscriber communications through the core network 30 using one of a number of networking topologies (such as, for example, those mentioned above) between the clients 10 and the server 18. The subscriber communications may be of any traffic type (such as, for example, voice, data, facsimile, video conferencing, and the like).

The network includes an optimizer functionality 50 that implements a layered-type concentration mechanism to ensure proper distribution of the required subscriber traffic to the right place, at the right time, and with the appropriate bandwidth granularity. A layered-type concentration mechanism categorizes the available switching mechanisms (such as, for example, the edge routers, cell switch routers, base station switching capabilities, line card switching capabilities, and the like) based on their aggregate size and level of concentration represented (for instance, 10 Gbit WAN concentration, 155 Mbps concentration, and 2 Mbps concentration). To reach this goal, the optimizer functionality 50 utilizes an optimized virtual traffic, topology and technology concept that manages the topology and technology used within the core network 30 (by controlling generic cell switch router and edge router configuration) and confines subscriber traffic to that portion of the core network that has been optimized (based on a topology and technology selection implemented through the generic cell switch routers and edge routers) to handle a specific type of subscriber traffic.

Object oriented design templates 60, referred to herein as "optimizer constituents classes", specify certain associations of traffic type, topology type and technology type that most efficiently support certain communication(s) through the core network 30 (i.e., optimize the core network for that communication). These templates 60, which may be instantiated as objects with their associated methods (i.e., operations) to be invoked, are maintained in the optimizer functionality 50 and are downloaded for storage in local memory (not shown) within the edge routers 32 and generic cell switch routers 34. Responsive to communications support needs within the core network 30, the optimizer functionality 50 then invokes the operations associated with selected ones of the templates 60 at each implicated edge router 32 and/or generic switch node 34 to configure the core network 30, through the individual router nodes, to implement a desired network optimization.

Figure 2:
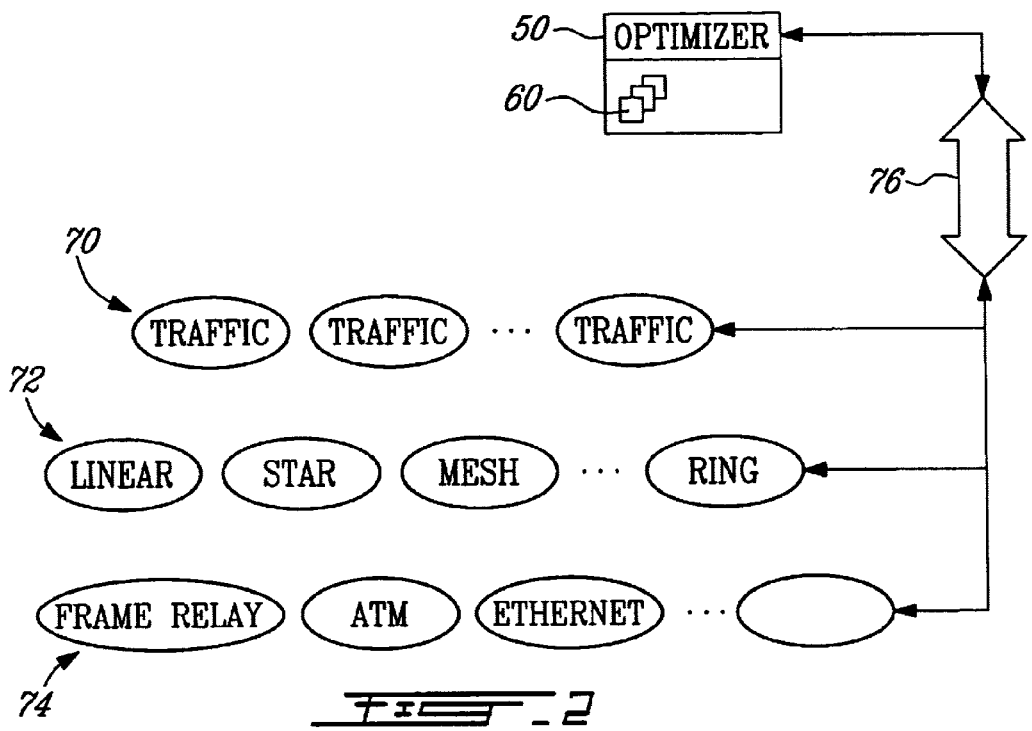
FIG. 2 is a logical view of the overall traffic, topology and technology managed by the optimizer functionality.

Reference is now made to FIG. 2 wherein there is shown a logical view of the overall traffic 70, topology 72 and technology 74 managed by the optimizer functionality 50. The double arrow 76 represents the two-way activity produced by processes that are spawned and the operations that are invoked across the different implicated edge routers 32 and/or cell switch routers 34 to represent and control traffic 70 types, topology 72 types and technology 74 types during core network configuration. This two-way activity 76, generally speaking, results in data collection concerning the present network configuration, procurement to switching nodes of the optimizer constituents, utilization of an expert system to select and invoke needed configuration methods, and testing of network operation to confirm optimization.

Figure 3:
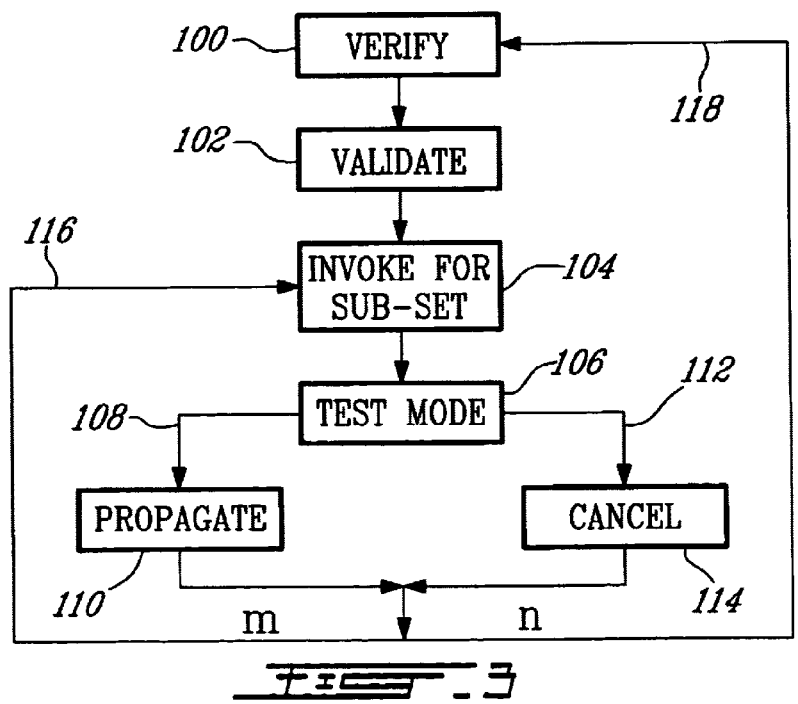
FIG. 3 is a flow diagram for the process implemented by the optimizer functionality in connection with managing traffic types, topology types and technology types.

Reference is now made to FIG. 3 wherein there is shown a flow diagram for the two-way activity 76 implemented by the optimizer functionality 50 in connection with managing traffic 70 types, topology 72 types and technology 74 types. In step 100, the optimizer functionality 50 verifies the edge routers 32 and cell switch routers 34 currently present within the core network 30. This verification may be performed, for example, through a polling exercise where identification requests are made of the switching node, and acknowledgments are monitored from the active nodes. In step 102, the optimizer functionality 50 validates the identity of the active (i.e., acknowledging) nodes. A copy of the currently in effect templates 60 representing the optimizer constituent classes are then downloaded as objects from the optimizer functionality 50 to the validated, active nodes.

Next, in step 104, the optimizer functionality 50 invokes the operations associated with selected ones of the traffic 70 types, topology 72 types and technology 74 types at certain ones of the edge routers 32 and/or generic cell switch routers 34 to configure a sub-set of resources (such as, for example, virtual circuits, routers, connection admission control, and the like) within the core network 30, through the individual implicated router nodes of that sub-set of resources, to implement a desired network optimization. The action of step 104 is taken only when needed to effectuate an updating to the optimization of the network. This determination is made by an expert system of the optimizer functionality 50 in response to a monitoring of network operation or a change in traffic type and/or volume of certain types of traffic being handled by the core network 30 and/or network condition (in terms of link failure, node addition or deletion, and the like). Following each instance of a newly implemented network optimization, the process, in step 106, enters a test mode utilizing a dedicated test virtual channel to determine whether the newly implemented optimizer constituents meet or exceed an expected level of network optimization. This test mode procedure is preferably implemented within only that sub-set of the overall network that has been reconfigured. If yes (branch 108), the operations for the selected ones of the optimizer constituents are propagated in step 110 throughout an affected portion (i.e., a number of resources such as, for example, virtual circuits, larger than the originally affected sub-set of resources) of the core network 30. If no (branch 112), the optimizer constituents previously implemented within the sub-set of the network are canceled in step 114. In one implementation, the process then loops 116 back to step 104 after "m" time periods or loops 118 back to step 100 after "n" time periods, wherein n>m, to effectuate periodic dynamic optimization of the network configuration. In an alternative implementation, the process loops 116 back to step 104 when triggered by a first event (for example, comprising a certain network status or state or data change), or loops 118 back to step 100 when triggered by a second event (for example, comprising a certain network status or state or data change), to effectuate sporadic dynamic optimization of the network configuration.

Figure 4:
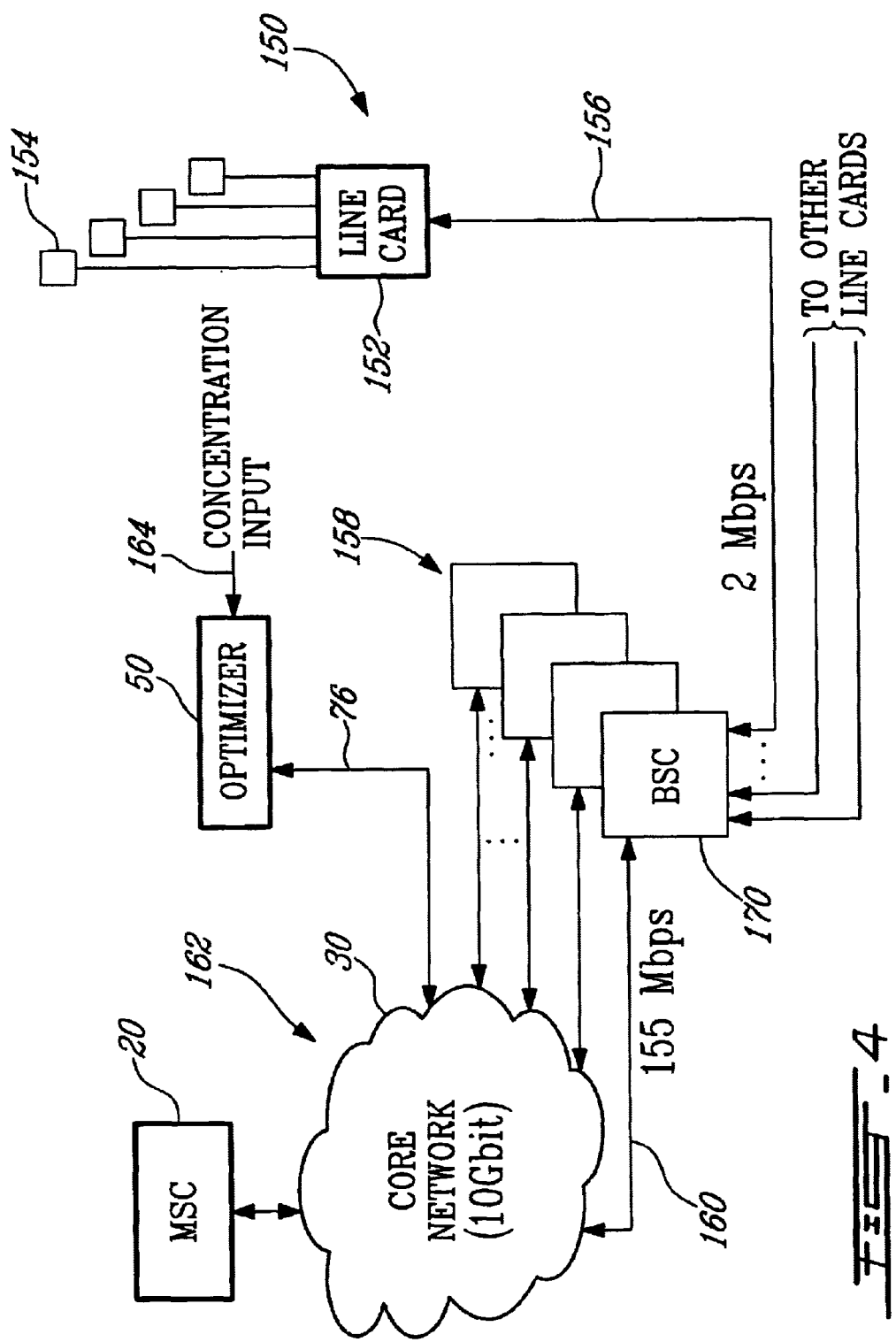
FIG. 4 is a block diagram illustrating a layered-type concentration within the network of FIG. 1.

Reference is now made to FIG. 4 wherein there is shown a block diagram illustrating a layered-type concentration within the network of FIG. 1. In this example, three levels of concentration are provided. The first level 150 is located at the line card 152 which concentrates calls from a plurality of cells 154 (for example, comprising time slots on a given air interface 14 frequency) onto a single 2 Mbps link 156. The second level 158 is located at the base station controller (i.e., the remote switching point) 170 which concentrates a plurality of links 156 together onto a single 155 Mbps link 160. The third level 162 is located at the core network 30 and mobile switching center 20 which concentrates a plurality of links 160 together to provide 10 Gbit service.

The system accordingly implements a layered control part that is divided into the previously recited three levels of concentration. Responsive to input data 164 concerning these levels of concentration (e.g., link failure, node addition or deletion, and the like) and the type of traffic being handled at the various levels of concentration, the optimizer 50 (through its expert system) provides triggers for the selection of traffic 70 types, topology 72 types and technology 74 types. What this accomplishes is that certain types of traffic are confined by the actions of the optimizer 50 to a portion of the core network 30 that has been optimized, through the selection of topology and technology, to handle that traffic. Of course, it is understood, that other portions of the core network 30 have been similarly optimized based on topology and technology selection and configuration to handle other types of traffic. The function of the edge routers and cell switch routers within the core network then is to properly route the traffic to its corresponding technology and topology optimized portion.

The expert system implemented by the optimizer functionality 50 relies on artificial intelligence in order to emulate the kind of intelligent behavior shown by experts. Expert systems contain a knowledge base and an inference engine. The knowledge base contains the specific domain knowledge (or facts), and the inference engine controls the reasoning process and user interface. In the context of the two-way activity 76 illustrated by FIG. 3, the expert system implements the actions of step 104 wherein the methods associated with the traffic 70 types, topology 72 types and technology 74 types are selected and then invoked at certain ones of the edge routers 32 and/or generic cell switch routers 34 to configure a sub-set of resources within the core network 30, through the individual implicated switching nodes, to implement a desired network optimization.

Configuration of an expert system to make optimization decisions is well within the capabilities of one skilled in the arts of artificial intelligence and expert system design. A more complete understanding of expert system operation and optimization decision-making may be obtained by reference to the following examples.

In a first example, the knowledge base may comprise information that the network under consideration for optimization must withstand worst-case traffic with a long-term dependency (i.e., self-similar traffic), and that the network is packet switched. Operation of the inference engine in the context of this knowledge base may produce the following optimization of the network: 1)voice traffic is given first priority, video conferencing traffic is given second priority, and Internet traffic is given lowest priority and is shaped with a 50 msec delay in order not to degrade other user flows; 2) the topology type is partially meshed for datagram routing; and, 3) the technology type is IP packets over ATM for quality of service.

In a second example, the knowledge base may comprise information that the network under consideration for optimization is a legacy circuit-switched application that must provide for hard end-to-end guaranteed performance. Operation of the inference engine in the context of this knowledge base may produce the following optimization of the network: 1) with legacy traffic, all types are of equal priority with hard end-to-end performances; 2) the topology type is a star for limited routing end-points; and, 3) the technology is ATM for circuit emulation over AAL1.

In a third example, the knowledge base may comprise information that the network under consideration for optimization is to be divided into sub-networks, and the sub-network under consideration for optimization is to handle 80% packet switched and 20% circuit switched emulated traffic. Operation of the inference engine in the context of this knowledge base may produce the following optimization of the network: 1) the packet switched traffic is scheduled with a prioritization scheme buffer and that the circuit switched emulated traffic cannot accept a cell delay variation greater than a certain threshold; 2) the topology type is a combination of mesh and tree; and, 3) the technology type is IP over multiple protocol label switching (MPLS) for packet switched traffic and ATM native emulation service for the circuit switched emulated traffic, with both technologies implementing a ship-in-the-night mode of operation.

In a fourth example, the knowledge base may comprise information that the network under consideration for optimization is a simple office, home office (SOHO) environment where 384 Kbps flows are required in a certain number of houses per point of presence. Operation of the inference engine in the context of this knowledge base may produce the following optimization of the network: 1) the SOHO traffic requires connections to H.323 codecs and signaling; 2) the topology type is a tree from the point of presence (i.e., a point to multi-point arrangement); and, 3) the technology type is MPLS with extended LDP for support of "set-up to N" and "tear-down from M" messages in order to negotiate add-on and deletion of leaves.

In each of the foregoing examples, once the selections are made by the expert system of the optimizer 50, the methods associated with the selected traffic 70 types, topology 72 types and technology 74 types are invoked at certain ones of the edge routers 32 and/or generic cell switch routers 34 to configure a sub-set of resources within the core network 30, through the individual implicated switching nodes, to implement a desired network optimization. Thus, it is seen that given certain concentration input 164 and other data relating to the knowledge base, the inference engine is capable of selecting both technology and topology for the network as well as priorities for traffic handling in order to provide an optimized configuration. Put another way, the expert system evaluates known facts and applies certain rules to configure the overall network (in terms of technology and topology) in a way that differs from a preset default configuration. By keeping track of the known facts, and applying the rules on either a periodic or sporadic basis, dynamic modification of the network configuration may be implemented to maintain the network in an optimal configuration for handling communications.

Figure 5:
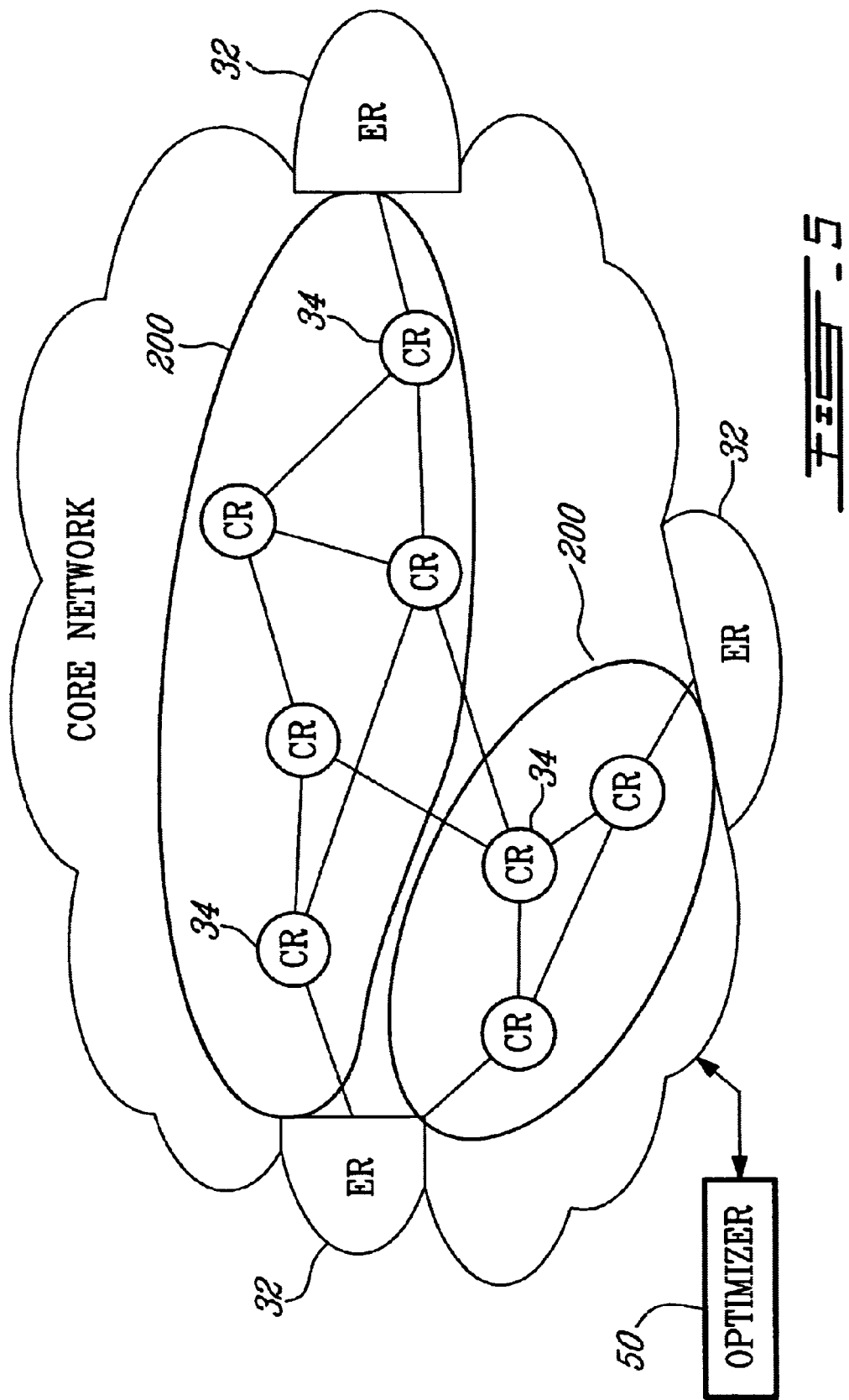
FIG. 5 is a block diagram illustrating operation of the optimizer to partition the network of FIG. 1 into a plurality of optimized sub-networks.

Reference is now made to FIG. 5 wherein there is shown a block diagram illustrating operation of the optimizer to partition the network of FIG. 1 into a plurality of optimized sub-networks. In some instances, the concentration input 164 and other data relating to the knowledge base that are processed by the expert system dictate an inference that the network must be partitioned into plural sub-networks 200, with each sub-network optimized in accordance with the operation of the expert system to provide certain communications service. The plural sub-networks 200 interact with each other as needed, and may (if necessary) have overlapping or shared resources (including, for example, virtual circuits and nodes). Within each sub-network, however, the included nodes are configured by invoking the methods associated with the selected traffic 70 types, topology 72 types and technology 74 types to provide optimal performance tailored to the needs of the traffic being handled. Thus, the network further functions, responsive to the presence of plural optimized sub-networks 200, to route and confine traffic to the appropriate correspondingly optimized sub-network. The third example discussed above illustrates how two sub-networks 200, one for packet switched traffic and another for circuit switched emulated traffic may be configured by the optimizer 50.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A core communications network, comprising:
   a plurality of cell switched routers interconnected in at least a partially meshed configuration;
   a plurality of edge routers connected to certain ones of the plurality of cell switched routers and supporting edge connection outside the core communications network;
   wherein the cell switched routers and edge routers support utilization of any selected one of a plurality of switching technologies in the context of any selected one of a plurality of networking topologies; and
   a functionality for dynamically selecting a switching technology for utilization by each cell switched router and edge router and for selecting a networking topology for connecting the plurality of cell switched routers and edge routers in order to optimize operation of the core communications network.

2. The communications network as in claim 1:
   wherein the plurality of switching technologies supported at each cell switched router and edge router include at least two of the following: frame relay, asynchronous transfer mode, and ethernet; and
   wherein the plurality of networking topologies supported for connecting the cell switched routers and edge routers include at least two of the following: linear, star, mesh, ring and tree.

3. The communications network as in claim 1 wherein the functionality comprises an expert system to select switching technology and networking topology.

4. The communications network as in claim 1:
   wherein each cell switched router and edge router stores a plurality of object oriented design templates concerning traffic, technology and topology; and wherein the functionality invokes operations associated with selected templates in selecting a switching technology for utilization by each cell switched router and edge router and selecting a networking topology for connecting the plurality of cell switched routers and edge routers in order to implement a desired optimization of the communications network.

5. A cellular communications system, comprising:

a mobile switching center;

a plurality of base stations, each supporting air interface communications with mobile stations; and a core communications network for interconnecting the mobile switching center to the plurality of base stations, the core communications network comprising:
   a plurality of cell switched routers interconnected in at least a partially meshed configuration;
   a plurality of edge routers connected to certain ones of the plurality of cell switched routers and supporting edge connection to the plurality of base stations and the mobile switching center;
   wherein the cell switched routers and edge routers support utilization of any selected one of a plurality of switching technologies in the context of any selected one of a plurality of networking topologies; and
   a functionality for dynamically selecting a switching technology for utilization by each cell switched router and edge router and for selecting a networking topology for connecting the plurality of cell switched routers and edge routers in order to optimize operation of the core communications network.

6. The cellular communications system as in claim 5:

wherein the plurality of switching technologies supported at each cell switched router and edge router include at least two of the following: frame relay, asynchronous transfer mode, and ethernet; and wherein the plurality of networking topologies supported for connecting the cell switched routers and edge routers include at least two of the following: linear, star, mesh, ring and tree.

7. The cellular communications system as in claim 5 wherein the functionality comprises an expert system to select switching technology and networking topology.

8. The cellular communications system as in claim 5:

wherein each cell switched router and edge router stores a plurality of object oriented design templates concerning traffic, technology and topology; and wherein the functionality invokes operations associated with selected templates in selecting a switching technology for utilization by each cell switched router and edge router and selecting a networking topology for connecting the plurality of cell switched routers and edge routers in order to implement a desired optimization of the communications network.

9. A method for optimizing a core communications network including a plurality of cell switched routers interconnected in at least a partially meshed configuration, and a plurality of edge routers connected to certain ones of the plurality of cell switched routers and supporting edge connection outside the core communications network, wherein the cell switched routers and edge routers support utilization of any selected one of a plurality of switching technologies in the context of any selected one of a plurality of networking topologies, the method comprising the steps of:

verifying the presence of cell switched routers and edge routers within the core communications network;

validating the present cell switched routers and edge routers;

invoking operations within a sub-set of the cell switched routers and edge routers to select an optimal switching technology and networking topology;

placing the sub-set of the cell switched routers and edge routers into a test mode to confirm optimal configuration; and propagating the operations to other cell switched routers and edge routers outside the sub-set if optimal configuration is confirmed.

10. The method as in claim 9 wherein the recited method is performed periodically to dynamically optimize core communications network configuration.

11. The method as in claim 9 wherein the recited method is performed sporadically to dynamically optimize core communications network configuration.

12. The method as in claim 9 further including the step of:

partitioning the core communications network into a plurality of sub-networks;

wherein the recited method is performed for each sub-network to optimize its sub-network configuration.

13. A method for optimizing a core communications network including a plurality of cell switched routers interconnected in at least a partially meshed configuration, and a plurality of edge routers connected to certain ones of the plurality of cell switched routers and supporting edge connection outside the core communications network, wherein the cell switched routers and edge routers support utilization of any selected one of a plurality of switching technologies in the context of any selected one of a plurality of networking topologies, the method comprising the steps of:

collecting knowledge base information concerning network operation;

inferencing from the collected knowledge base information a preferred switching technology and networking topology that would optimize network configuration; and implementing the preferred switching technology and networking topology at certain implicated cell switched routers and edge routers to optimize network configuration.

14. The method as in claim 13 further including the step of:

partitioning the core communications network into a plurality of sub-networks;

wherein the recited method is performed for each sub-network to optimize its sub-network configuration, and the certain implicated cell switched routers and edge routers comprise those routers within each respective sub-network.

15. The method as in claim 13 wherein the step of implementing comprises the steps of:

invoking operations within a sub-set of the cell switched routers and edge routers to select the preferred switching technology and networking topology;

placing the sub-set of the cell switched routers and edge routers into a test mode to confirm optimal configuration; and propagating the operations to other cell switched routers and edge routers outside the sub-set if optimal configuration is confirmed.

16. The method as in claim 13 wherein the recited method is performed periodically to dynamically optimize core communications network configuration.

17. The method as in claim 13 wherein the recited method is performed sporadically to dynamically optimize core communications network configuration.

* * * * *